United States Patent [19]

Takeuchi et al.

[11] Patent Number: 5,500,549
[45] Date of Patent: Mar. 19, 1996

[54] SEMICONDUCTOR YAW RATE SENSOR

[75] Inventors: Yukihiro Takeuchi, Seto; Kozo Shibata, Kariya; Yoshinori Ohtsuka, Okazaki; Kazuhiko Kano, Obu; Toshimasa Yamamoto, Bisai, all of Japan

[73] Assignee: Nippondenso Co., Ltd., Kariya, Japan

[21] Appl. No.: 357,258

[22] Filed: Dec. 13, 1994

[30] Foreign Application Priority Data

Dec. 13, 1993 [JP] Japan .................................. 5-311762

[51] Int. Cl.$^6$ ............................................. H01L 29/82
[52] U.S. Cl. ........................... 257/415; 257/417; 257/418; 257/420; 73/514.02; 73/514.15; 73/514.36; 73/DIG. 1
[58] Field of Search ...................... 257/417, 418, 257/419, 420, 415, 414; 73/517 A, 515, 517 R, 514.02, 514.15, 514.22, 514.29, 514.36, 514.21, DIG. 1

[56] References Cited

U.S. PATENT DOCUMENTS

| 4,571,661 | 2/1986 | Hoshino | 257/418 X |
|---|---|---|---|
| 4,598,585 | 7/1986 | Boxenhorn | 73/505 |
| 5,285,097 | 2/1994 | Hirai | 257/417 |

FOREIGN PATENT DOCUMENTS

| 194953 | 9/1986 | European Pat. Off. . |
|---|---|---|
| 60-213814 | 10/1985 | Japan . |
| 61-114123 | 5/1986 | Japan . |
| 4142420 | 5/1992 | Japan . |
| 4134208 | 5/1992 | Japan . |
| 4252961 | 9/1992 | Japan . |
| 5142251 | 6/1993 | Japan . |
| 5180862 | 7/1993 | Japan . |
| 0666569 | 3/1994 | Japan . |
| 6123628 | 5/1994 | Japan . |
| 6130081 | 5/1994 | Japan . |
| 6204502 | 7/1994 | Japan . |
| 2223309 | 4/1990 | United Kingdom . |

*Primary Examiner*—William Mintel
*Attorney, Agent, or Firm*—Cushman, Darby & Cushman

[57] ABSTRACT

A semiconductor yaw rate sensor, which can be structured easily by means of an IC fabrication process, such that a yaw rate detection signal due to a current value is obtained by means of a transistor structure and a method of producing the same is disclosed. A weight supported by beams is disposed at a specified interval from a surface of a semiconductor substrate, and movable electrodes and excitation electrodes are formed integrally with the weight. Fixed electrodes for excitation use are fixed to the substrate in correspondence to the excitation electrodes. Along with this, source electrodes as well as drain electrodes are formed by means of a diffusion layer on a surface of the substrate at positions opposing the movable electrodes, such that drain current changes in correspondence with displacement of the movable electrodes by means of Corioli's force due to yaw rate, and the yaw rate is detected by this current.

27 Claims, 11 Drawing Sheets

SEMICONDUCTOR YAW RATE SENSOR

CROSS REFERENCE TO RELATED APPLICATION

This application is based upon and claims the benefit of priority from Japanese Patent application No. 5-311762 filed on Dec. 13, 1993, the contents of which are incorporated herein by reference.

BACKGROUND OF THE INVENTION

1. Field of the Invention

The present invention relates to a semiconductor yaw rate sensor of a transistor type used, for example, in body control system or navigation system of a vehicle, and to a method of producing the same.

2. Related Arts

A vibration gyroscope is disclosed in United Kingdom Patent Application Publication No. GB 2 223 309 A and is described as a yaw rate sensor that detects yaw rate and the like that act upon a body of a vehicle, for example. Such a vibration gyroscope has a vibrator wherein a piezoelectric element is glued to a specified surface of a square rod made of metal, and is structured such that this is supported by means of a fine rod. An angular speed sensor disclosed in Japanese Patent Application Laid-open No. 4-142420 has a piezoelectric element glued to a tuning fork made of metal. In either case, these devices used to detect the acceleration of yaw rate and the like subject the main unit to vibration with a piezoelectric element, and attempt to detect, by means of changes in voltage detected by the piezoelectric element, distortion generated by a Corioli's force generated by means of the yaw rate which is the subject of measurement.

Performance such as detection sensitivity in a sensor mechanism structured in this manner comes to be influenced by the method of support and machining precision of the vibrator. Consequently, in order to produce a high-performance sensor mechanism, there exist the problems of a high degree of difficulty in the machining and assembly thereof, and of necessarily high cost corresponding to the requisite time and difficulty of machining and assembly. Additionally, with respect to achieving smaller size of the sensor mechanism as well, difficulty is encountered due to limitations in machining and assembly.

SUMMARY OF THE INVENTION

In light of the above-described problems, it is an object of this invention to provide a yaw rate sensor which can be manufactured easily and at low cost, and which can also detect exerted acceleration with high accuracy, and a method of producing the same.

A yaw rate sensor according to this invention includes a movable electrode disposed above a semiconductor substrate and freely displacable by means of a beam structure over a specified interval from the surface of this semiconductor substrate. Furthermore, a fixed electrode is provided for excitation use. The electrode is positioned above the semiconductor substrate. The fixed electrode utilizes static electricity to cause the movable electrode to vibrate in a gap between the movable electrode over a specified interval and the surface of the semiconductor substrate. On a surface portion of the semiconductor substrate, source and drain electrodes are formed by means of impurities diffusion regions at positions opposing the movable electrode. Accordingly, a transistor is formed by means of the movable electrode as well as the source and drain electrodes. The yaw rate is detected by means of current changes between the foregoing source and drain electrodes by means of displacement of the movable electrode accompanying the action of Corioli's force generated by means of yaw rate.

The movable electrode includes a main body supported freely and displacably by means of a beam. An excitation electrode of a spline-shaped member protrudes to the outer periphery of the main body. The fixed electrode for excitation use is fixed to the semiconductor substrate, and includes spline-shaped members in a comb-tooth configuration such that spline-shaped electrodes that protrude from the main body of the movable electrode are established alternatingly via gaps.

A yaw rate sensor structured in this manner is manufactured by means of a first step that forms a sacrificial layer on a surface of a semiconductor substrate. A second step forms on the sacrificial layer a movable electrode having a plurality of beams for supporting excitation and a fixed electrode for excitation use which opposes this movable electrode. A third step self-aligningly diffuses impurities in the semiconductor substrate with respect to the movable electrode and forms source and drain electrodes positioned opposite the movable electrode. In a fourth step, the sacrificial layer is etched away between the semiconductor substrate and the movable electrode, thereby being structured such that the movable electrode may be vibrated by means of electrostatic force from the fixed electrode for excitation use and is displacable by a Corioli's force generated by means of the yaw rate.

A yaw rate sensor formed in this manner causes the movable electrode to vibrate due to a fixed electrode for excitation use. When the yaw rate acts on this vibrating movable sensor, the movable electrode is displaced by means of a Corioli's force. When this movable electrode is displaced, current flowing between a source electrode and a drain electrode forming a transistor such that this movable electrode comes to act as a gate electrode changes, and as a result the yaw rate is detected by means of this current change.

Here, force F1 exerted in a case where the fixed electrode for excitation use and the excitation electrode are structured to be parallel flat plates so that a capacitor gap changes is as follows.

$$F1 = 1/2 \cdot \epsilon \cdot w \cdot h/g^2 \cdot V^2 \tag{1}$$

Wherein $\epsilon$ represents a dielectric constant of air, w represents an opposing length of the fixed electrode and the excitation electrode, h represents an opposing thickness of the fixed electrode and the excitation electrode, g represents a distance (gap) between the fixed electrode and the excitation electrode, and V represents a voltage applied between the fixed electrode and the excitation electrode.

As can be understood from the expression (1), in a case wherein the excitation electrode is displaced in addition to displacement of the movable electrode, gap g changes and so force F1 also changes. For example in a case where gap g changes from 4 μm to 2 μm, force F1 is quadrupled. Consequently, in order to obtain stabilized excitation it is necessary to control both the gap g and the applied voltage V during excitation, which is not easy. In contrast to this, in a case wherein the fixed electrode for the excitation use and the excitation electrode are combined in a comb-tooth configuration, electrostatic force acts so as to pull the spline-shaped comb tooth of the excitation electrode. Because of this, length w of the opposing portion comes to change without gap g changing, and electrostatic force F2 is expressed as follows.

$$F1 = 1/2 \cdot \epsilon \cdot h/g \cdot V^2 \quad (2)$$

As can be understood from this expression (2), even if the comb tooth of the excitation electrode is pulled by the constant, fixed electrode electrostatic force F2, it nonetheless becomes possible to stably cause vibration to act on the movable electrode simply by causing the applied voltage V to change.

Additionally, according to a method of production of a yaw rate sensor structured in this manner, if the amount of perpendicular or horizontal displacement of the movable electrode due to Corioli's force is hypothesized to be for example 0.05 μm, and the thickness of the sacrificial layer is taken to be 0.5 μm, the ratio of change in the perpendicular direction becomes 10%. If it is attempted to obtain a similar ratio of change with respect to the horizontal direction as well, the overlap of the movable electrode and the source and drain electrodes must be made to be 0.5 μm. However, in the present production process it is extremely difficult to realize overlap of 0.5 μm with good precision, and it becomes difficult to boost the detection accuracy of the horizontal amount of displacement. By means of causing the gate width to be formed by means of impurities diffusion, and by means of establishing an annealing temperature and time in the production process, minute gate widths can easily be controlled.

By means of causing yaw rate to be detected by means of current change, it becomes possible to structure an ultra-compact yaw rate sensor, and if for example the current value is made to be 10 μA, the size of the transistor required for this is 10×10 μm or less. Furthermore, by means of surface micromachining technology applying IC technology, the respective dimensional and positional accuracies of the beams, weight (mass), fixed electrode for excitation use, movable electrode, and even the source and drain electrodes can be vastly improved in comparison with the square rod and tuning fork types according to the related art, and a high-performance yaw rate sensor with greater compactness and low cost can be obtained.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

Figure 1:
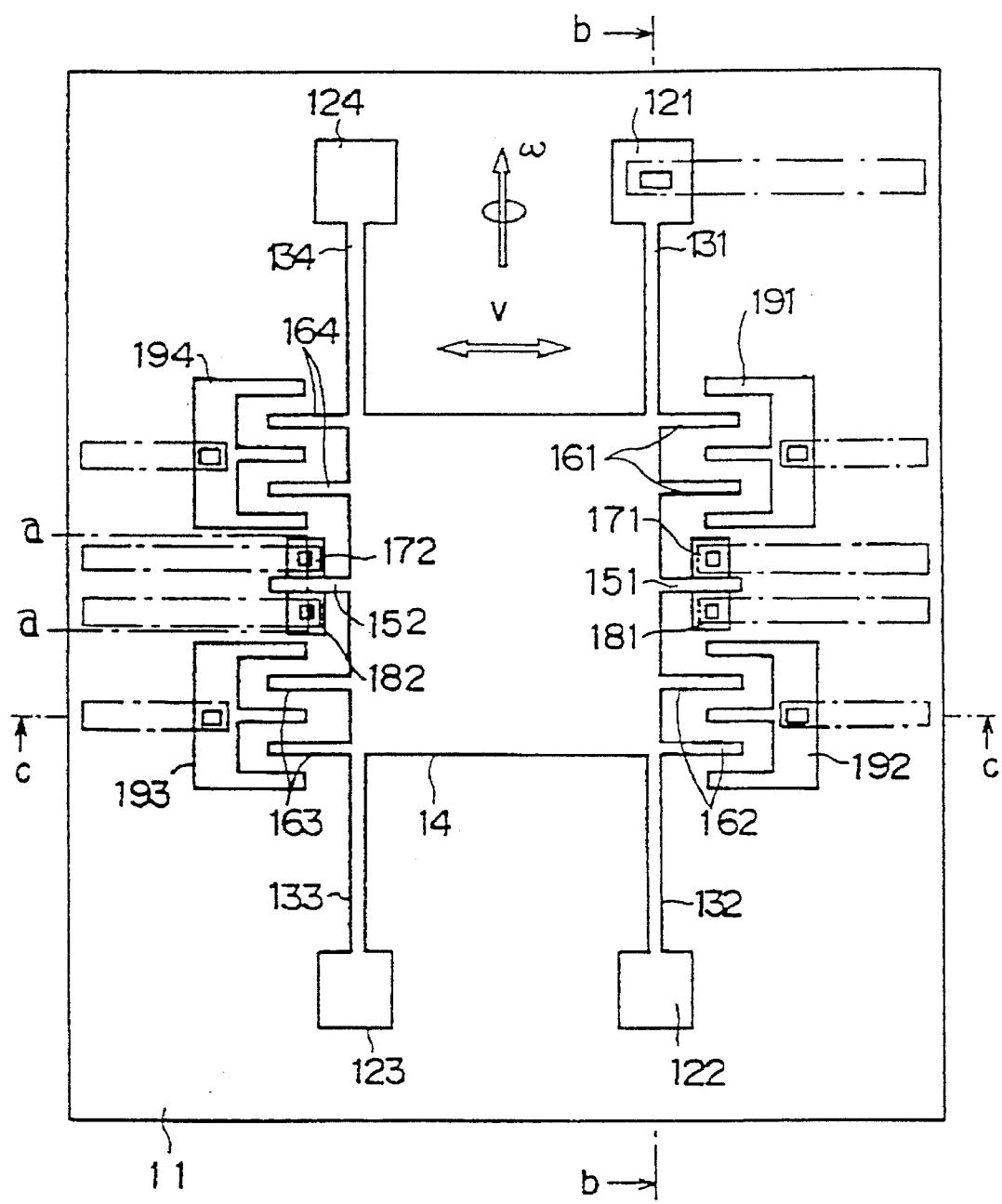
FIG. 1 is a planar structural diagram illustrating a semiconductor yaw rate sensor according to a first embodiment of this invention.

A first embodiment according to this invention will be described hereinafter with reference to the drawings. FIG. 1 indicates a planar structure of a yaw rate sensor. According to this embodiment, semiconductor substrate 11 is formed of a p-type silicon wafer. Anchors 121 to 124 at, for example, four locations are formed on semiconductor substrate 11, and weight (mass) 14 is supported by means of beams 131 to 134, with one respective end of each being supported by anchors 121 to 124, respectively.

On weight 14 are integrally formed movable electrodes 151 and 152 of spline configuration so as to structure gate electrodes of transistors caused to protrude laterally from for example an opposing pair of side portions. Weight 14 is structured as the main body mechanism of movable electrodes 151 and 152, and is established in order to earn an amount of displacement due to yaw rate. Moreover, excitation electrodes 161 to 164 protrude from weight 14 at positions at the respective two sides of movable electrodes 151 and 152 and establish a respective pair of splines in a parallel comb-tooth configuration. Excitation electrodes 161 to 164 act to impart vibration to weight 14 and movable electrodes 151 and 152.

Anchors 121 to 124, beams 131 to 134, weight 14, movable electrodes 151 and 152, and also excitation electrodes 161 to 164 are structured integrally of a heat-resistant metal, such as, tungsten or polycrystalline silicon. According to this embodiment, polycrystalline silicon is used as a representative material.

Weight 14 and movable electrodes 151 and 152 and excitation electrodes 161 to 164 structured integrally with each other are disposed on a main surface of semiconductor substrate 11 at specified intervals, and are maintained by means of anchors 121 to 124 via beams 131 to 134.

On the main surface of semiconductor substrate 11, composed of p-type silicon, corresponding respectively to spline-shaped movable electrodes 151 and 152 are formed source electrodes 171 and 172 and drain electrodes 181 and 182 composed of a diffusion layer formed by means of introducing n-type impurities by such means as ion implantation or the like, thereby forming transistors wherein movable electrodes 151 and 152 act as respective gate electrodes.

Fixed electrodes for excitation use 191 to 194 are disposed to correspond respectively to excitation electrodes 161 to 164. These fixed electrodes for excitation use 191 to 194 are each fixed at a height position identical to the excitation electrodes 161 to 164 on the main surface of semiconductor substrate 11. Each of fixed electrodes 191 to 194 have three splines of a comb-tooth configuration, the central splines thereof being established in central positions of the pairs of splines forming respectively excitation electrodes 161 to 164, the other two splines thereof being established at respective positions on the outer sides of the foregoing pairs of splines, established so as to mutually make up the teeth of a comb such that specified gaps are formed in the mutual intervals of the respective comb teeth thereof.

Respective fixed electrodes for excitation use 191 to 194 are each connected via an aluminum lead to a power supply (not illustrated), are supplied with a voltage signal of a specified frequency, cause the excitation of electrodes 161 to 164, forcing them to vibrate by means of electrostatic force, and cause weight 14 and movable electrodes 151 and 152 to vibrate. In this case, weight 14 provided integrally with movable electrodes 151 and 152 and excitation electrodes 161 to 164 is connected to an external circuit via aluminum leads. Moreover, the source electrodes 171 and 172 and drain electrodes 181 and 182 are also connected via aluminum leads to an external current detector circuit not illustrated.

Figure 2A:
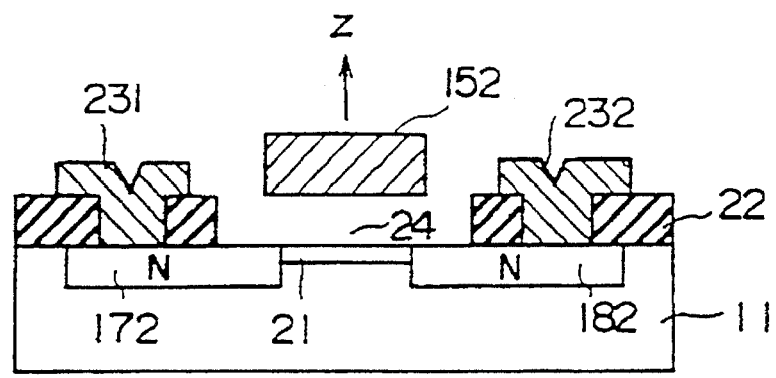
FIGS. 2A, 2B, and 2C are sectional views of portions corresponding respectively to line a—a, line b—b, and line c—c, respectively, of FIG. 1.

FIG. 2A indicates a sectional structure of a portion corresponding to line a—a of FIG. 1. Semiconductor substrate 11 is formed of p-type silicon, with source electrode 172 and drain electrode 182 formed by means of a diffusion layer of n-type impurities on the main surface thereof. Inversion layer 21 is formed between the source electrode 172 and drain electrode 182 by means of a movable electrode for gate use 152. Accordingly, 22 is an insulation film composed of a layer insulation film formed on semiconductor substrate 11, and 231 and 232 are aluminum leads connected respectively to source electrode 172 and drain electrode 182. Between movable electrode 152 and semiconductor substrate 11 is established an air gap 24 corresponding to the thickness of insulation film 22. Movable electrode 152, taken to be for gate use, is displacable perpendicularly to semiconductor substrate 11 and perpendicularly to this drawing paper surface.

Figure 2B:
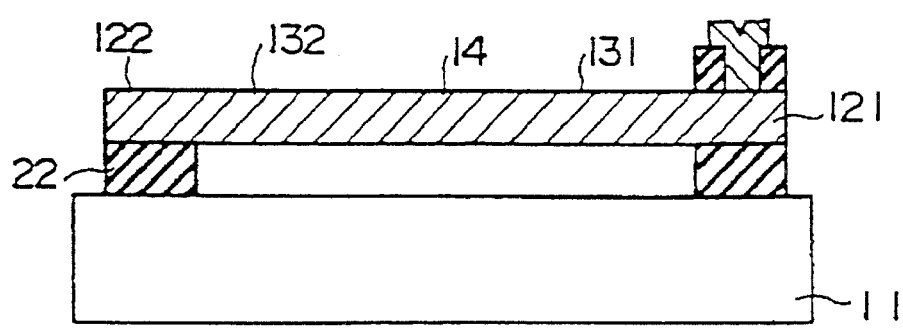

FIG. 2B indicates a sectional structure of a portion corresponding to line b—b of FIG. 1. Weight 14, formed of, for example, polycrystalline silicon, is established so as to be supported by insulation film 22 formed on semiconductor substrate 11. Weight 14 is supported between anchors 121 and 122 via beams 131 and 132. Here, insulation film 22 is used to establish air gap 24, and is formed from silicon dioxide, silicon nitride, or the like.

Figure 2C:
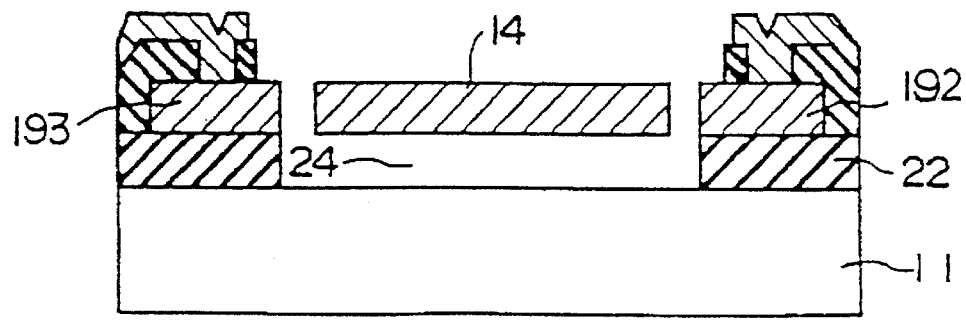

Insulation film 22 is formed of a sacrificial layer established together with weight 14 and beams 131 to 134 in the interval between semiconductor substrate 11 and movable electrodes 151 and 152 (not illustrated in this drawing), which, except for the portions corresponding to the anchors 121 to 124, is etched away to form air gap 24. At the time of this etching, an etching liquid is used which etches only insulation film 22 that is the sacrificial layer without etching substrate 11 and the polycrystalline silicon that is the material forming weight 14, beams 131 to 134, movable electrodes 151 and 152, and also the anchors 121 to 124. FIG. 2C is a sectional structure of a portion corresponding to line c—c of FIG. 1, and gap 24 is established between weight 14 and the surface of semiconductor substrate 11.

Next, a method of production of a yaw rate sensor structured in this manner will be described with reference to FIGS. 3A to 3I. A state representing the portion shown in FIG. 2A is indicated in these drawings. Additionally, a MOSFET device as a sensor processor circuit is hypothesized on the right-hand half, and the production process thereof is indicated as well.

Figure 3A:
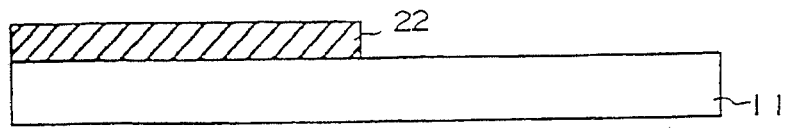
FIGS. 3A to 3I are sectional views sequentially describing methods of production of the yaw rate sensor according to the present invention.
Figure 3B:
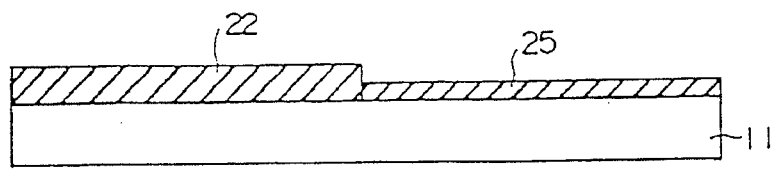

First, as shown in FIG. 3A, insulation film 22 taken to be a sacrificial layer corresponding to the portion for sensor production is formed on a surface of semiconductor substrate 11 composed of p-type silicon. Insulation film 22 may be formed by removing insulation film on a portion for transistor production after first forming the entire main surface of substrate 11. Accordingly, as shown in FIG. 3B, gate insulation film 25 is formed by means of gate oxidation on the main surface of semiconductor substrate 11 corresponding to the portion for the transistor production.

Figure 3C:
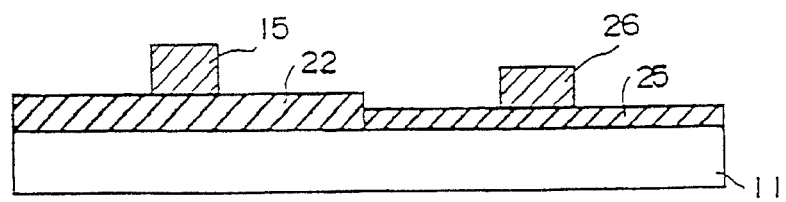
Figure 3D:
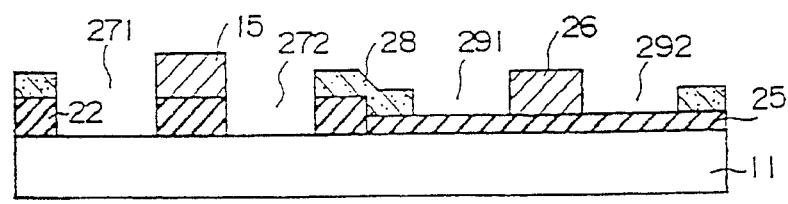

Next, as shown in FIG. 3C, a film of polycrystalline silicon is formed on insulation films 22 and 25, and movable electrode 15 as well as transistor gate 26 are patterned through a photolithographic step. Simultaneously, anchors 121 to 124, beams 131 to 134, weight (mass) 14 and the like (which are not indicated in this drawing) are formed. Accordingly, as shown in FIG. 3D, resist 28 is formed by means of a photolithographic step, openings 271 and 272 are formed in insulation film 22, with windowing self-aligningly performed with respect to movable electrode 15.

Figure 3E:
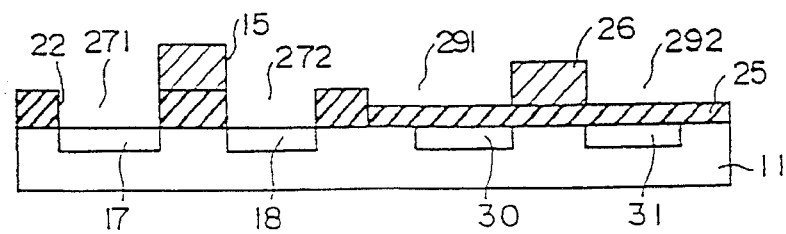

Additionally, openings 291 and 292 are self-aligningly windowed in the portion for transistor production by means of resist 28. When windowed in this manner, as shown in FIG. 3E, impurities is introduced into semiconductor substrate 11 by a means such as ion implantation, source electrode 17 and drain electrode 18 composed of an n-type diffusion layer and corresponding to movable electrode 15 are formed. Moreover, source electrode 30 and drain electrode 31 of a transistor portion are formed.

Figure 3F:
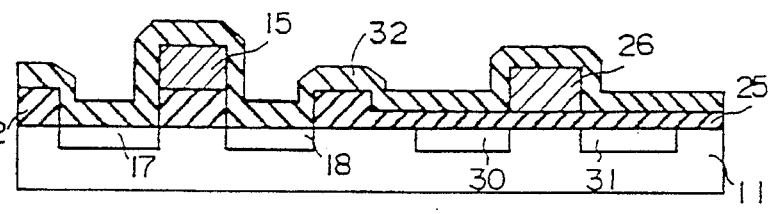
Figure 3G:
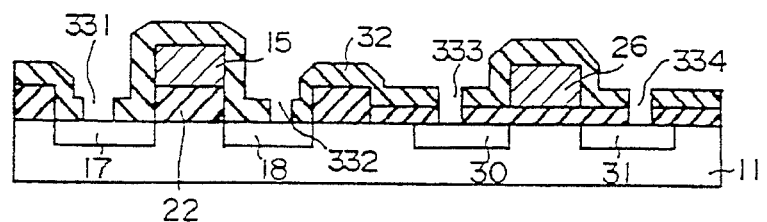
Figure 3H:
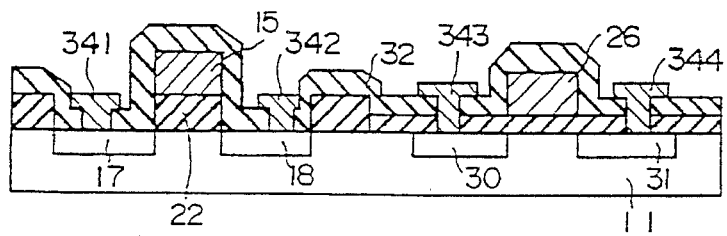

Next, as shown in FIG. 3F, layer insulation film 32 is formed over the entire surface in order to electrically insulate movable electrode 15 and transistor portion gate 26 from the aluminum leads. Accordingly, as shown in FIG. 3G, contact holes 331 to 334 corresponding to source electrode 17 and drain electrode 18 as well as source electrode 30 and drain electrode 31 are created with respect to layer insulation film 32. As shown in FIG. 3H, aluminum, which is the electrode material corresponding to each respective contact hole 331 to 334, is filmed, and aluminum leads 341 to 344 are thereby formed.

Figure 3I:
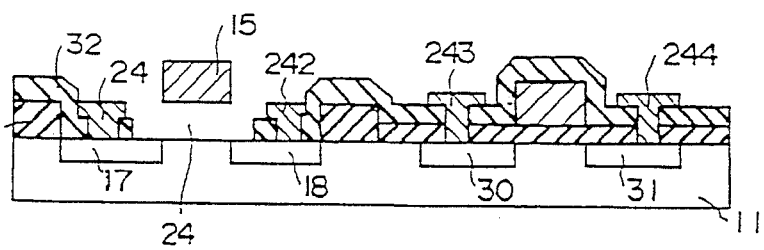

Accordingly, as shown in FIG. 3I, insulation film 22 beneath the movable electrode 15 is taken to be a sacrificial layer and etched so that air gap 24 is formed beneath movable electrode 15, and the yaw rate sensor is completed.

Operation of a yaw rate sensor structured in this manner will be described. When voltage is applied to movable electrodes for gate use 151 and 152 therebetween semiconductor substrate 11, inversion layer 21 is formed between source electrodes 171 and 172 and the drain electrodes 181 and 182, respectively, and current flows mutually therebetween.

Additionally, when excitation voltage of a certain frequency is applied between fixed electrodes for excitation use 191 to 194 and excitation electrodes 161 to 164, horizontal vibration is generated in excitation electrodes 161 to 164 by means of electrostatic force, and movable electrodes 151 and 152 are also vibrated together with weight 14. A Corioli's force generated by means of the yaw rate is proportional to the speed of this vibration, and in order to increase the vibration speed it is preferable to select a frequency with a resonance point where amplitude becomes large.

When a yaw rate, which is horizontal with semiconductor substrate 11 and also has an axis perpendicular to the vibration, is generated with respect to weight 14 and movable electrodes 151 and 152 taken to be gates that are excited and vibrated in this manner. A Corioli's force perpendicular to the orientation of substrate 11 and proportional to the vibration speed and the mass of the vibrating member is generated, and weight 14 and movable electrodes 151 and 152 are displaced perpendicularly to substrate 11. Accordingly, by means of movable electrodes for gate use 151 and 152 being displaced perpendicularly to substrate 11, electrical field intensity changes and the currents flowing between respective source electrodes 171 and 172 and drain electrodes 181 and 182 change, and the yaw rate can be detected by means of this current change.

That is to say, when movable electrodes for gate use 151 and 152 have been displaced in direction z indicated by an arrow in FIG. 2A, the carrier concentration of inversion layer 21 drops and current is reduced. In a case wherein movable electrodes 151 and 152 have been displaced in the opposite direction, the carrier concentration of the inversion layer rises and current between the source and drain increases. Additionally, by means of perpendicular displacement of movable electrodes 151 and 152, the capacitance of the transistor of this portion changes and the threshold voltage varies, current between the source and drain changes further, a type of electrical amplification occurs, and detection performance of high sensitivity comes to be established. Consequently, according to a yaw rate sensor formed in this manner, yaw rate is detected by means of rises and falls in the amount of current, an amplification function also simultaneously comes to be held, and performance as well as functioning are improved.

In this yaw rate sensor, a thin film formed on silicon substrate 11, for example, polycrystalline doped with impurities at a high concentration or a material such as a metal with heat resistance, is used as the material of beams 131 to 134. For this reason, it becomes possible to adequately reduce fluctuations in the thickness of beams 131 to 134. Generally, in a case wherein a single-point load is applied to a cantilever or doubly supported beam, the displacement thereof is inversely proportional to the third power of the beam's thickness and the first power of the beam's width. For this reason, extreme precision is demanded in the machining of the thickness of the beam in comparison with the machining of the width thereof.

Here, in order to negate current change due to the action of acceleration which becomes noise, when the yaw rate cause, movable electrodes 151 and 152 are made movable so as to inscribe a circle (ellipse) perpendicularly with respect to the plane of substrate 11, and for this reason the times when, for example, movable electrodes 151 and 152 approach closest to or move farthest from substrate 11 in keeping with the cycle of vibration are constantly detected, and when the differential thereof is caused to be taken, the current change component due to acceleration can be negated.

In a method of production indicated according to this embodiment, the thickness of beams 131 to 134 can be controlled by means of the deposition thickness of the thin film, and control of the thin film is markedly favorable in comparison with the mechanical bulk machining that is previously known. Consequently, the control of the amount of displacement of the movable portions when a Corioli's force is generated by means of yaw rate is markedly improved.

Additionally, in order to form beams 131 to 134, a polycrystalline layer of beams configuration was formed after forming a sacrificial layer on semiconductor substrate 11. Beams 131 to 134, with specified intervals established, were formed on the surface of substrate 11 by means of etching of the sacrificial layer. Here, the sacrificial layer refers to a thin film earlier formed with the object of ultimate removal. The carrier concentration of the transistor inversion layer is inversely proportional to the distance between substrate 11 and the gate electrode (movable electrode), and current also is similarly inversely proportional to this distance.

In a method of production according to this embodiment, the distances between movable electrodes 151 and 152 which are gates and semiconductor substrate 11 is controlled by means of the thickness of the sacrificial layer, and because control of the film thickness of the sacrificial layer is favorable in this case, control of the current values between the source electrodes and the drain electrodes is also markedly improved.

Moreover, this yaw rate sensor provides source and drain electrodes on semiconductor substrate 11 which are perpendicular relative to the movable electrodes for gate use 151 and 152, and adopts a transistor structure which causes current between the source and drain to change according to displacement of the movable electrodes 151 and 152. Consequently, displacement of the movable electrodes 151 and 152 is detected from current changes between the source and drain, and the yaw rate is measured. In the transistor, drain current is caused to change by means of causing normal gate voltage to change, but the carrier concentration of the inversion layer changes and the drain current changes even with a change in the gap between the gate and substrate, and the displacement of movable electrodes for gate use 151 and 152 which have received a Corioli's force generated by means of the yaw rate can be detected by means of the amount of current between source electrodes 171 and 172 and respective drain electrodes 181 and 182.

Additionally, a threshold voltage exists in addition to field intensity between the gate and substrate as a factor for determining the drain current in the transistor. The threshold voltage is a function of the electrostatic capacitance between the gate and substrate, and when capacitance becomes larger (i.e., when the distance between the gate and substrate becomes shorter), the threshold voltage becomes smaller. Additionally, when the threshold voltage becomes smaller, drain current increases even in a case wherein the field intensity between the gate and substrate is equal. Consequently, when the gate movable electrodes have been displaced perpendicularly with respect to semiconductor substrate 11 by means of the yaw rate, the threshold voltage changes and because of this the drain current also changes in correspondence with the yaw rate.

Here, in a case where movable electrodes for gate use 151 and 152 have been displaced in the direction of substrate 11, the threshold voltage becomes smaller due to the increase in capacitance, and the drain current increases. Furthermore, because the field intensity between the gate and substrate becomes larger, the drain current increases. Consequently, a change in drain current occurs which is greater than the rate of displacement of movable electrodes for gate use 151 and 152.

For example, if the distance between the gate and substrate 11 is set at 0.5 μm, the gate length is set at 2 μm, the source-drain voltage is set at 5 V, the substrate carrier concentration is set at $2 \times 10^{15}$ cm$^{-3}$, the relative dielectric constant between the gate and substrate is set at 1 (i.e., air is hypothesized), and the gate voltage is set at 10 V, then the relationship between the displacement of the gate and change in the drain current value is predicted. When 0.005 μm displacement of the gate toward the substrate occurs, i.e., at a rate of displacement of 1%, the rate of drain current change becomes 4.87%, and amplification of 4.87 times occurs.

Because the field intensity and threshold voltage change in this manner due to displacement of movable electrodes for gate use 151 and 152, a large rate of drain current change can be obtained even in a case wherein displacement of the gate is small.

Moreover, in fabricating this yaw rate sensor, source and drain electrodes 171 and 172 and 181 and 182 were formed by means of a diffusion layer formed self-aligningly after the configuration of movable electrodes for gate use 151 and 152 were formed. That is to say, after forming a sacrificial layer on semiconductor substrate and forming the configuration of the movable electrodes for gate use 151 and 152, windows are created in the portion to form the source and drain electrodes, and thereafter a diffusion layer structuring source electrodes 171 and 172 as well as drain electrodes 181 and 182 is formed by introducing impurities into a specified portion of semiconductor substrate 11 via these windows.

Consequently, it becomes possible to always form movable electrodes for gate use 151 and 152 reliably in the central portion between source electrodes 171 and 172 and drain electrodes 181 and 182, and position-alignment tasks in the fabrication process can be simplified. Additionally, these methods of production are all IC fabrication processes in and of themselves, and can support diversion thereof; a sensor structure body can be manufactured within an IC fabrication process, and integration with other circuit elements easily becomes possible.

In a yaw rate sensor described according to this embodiment, a yaw rate detector was structured by means of a doubly supported construction, but this can of course also be achieved with cantilever construction, and moreover there is no particular need for the number of beams to be four. Additionally, transistors as well as excitation electrodes were provided on both sides in the direction of vibration, but it is of course acceptable for this to be one side. In addition, the number of comb teeth of the fixed electrodes for excitation use was indicated as three on the fixed side and two on the movable side, but a structure combining different numbers is also acceptable. Furthermore, employment of a p-type semiconductor as the substrate was described, but a structure wherein this is an n-type substrate is also acceptable, and in this n-type case the diffusion electrodes are structured as p-type. Moreover, there is no need for weight 14 to be square; a structure with, for example, a triangular configuration is also possible.

Figure 4:
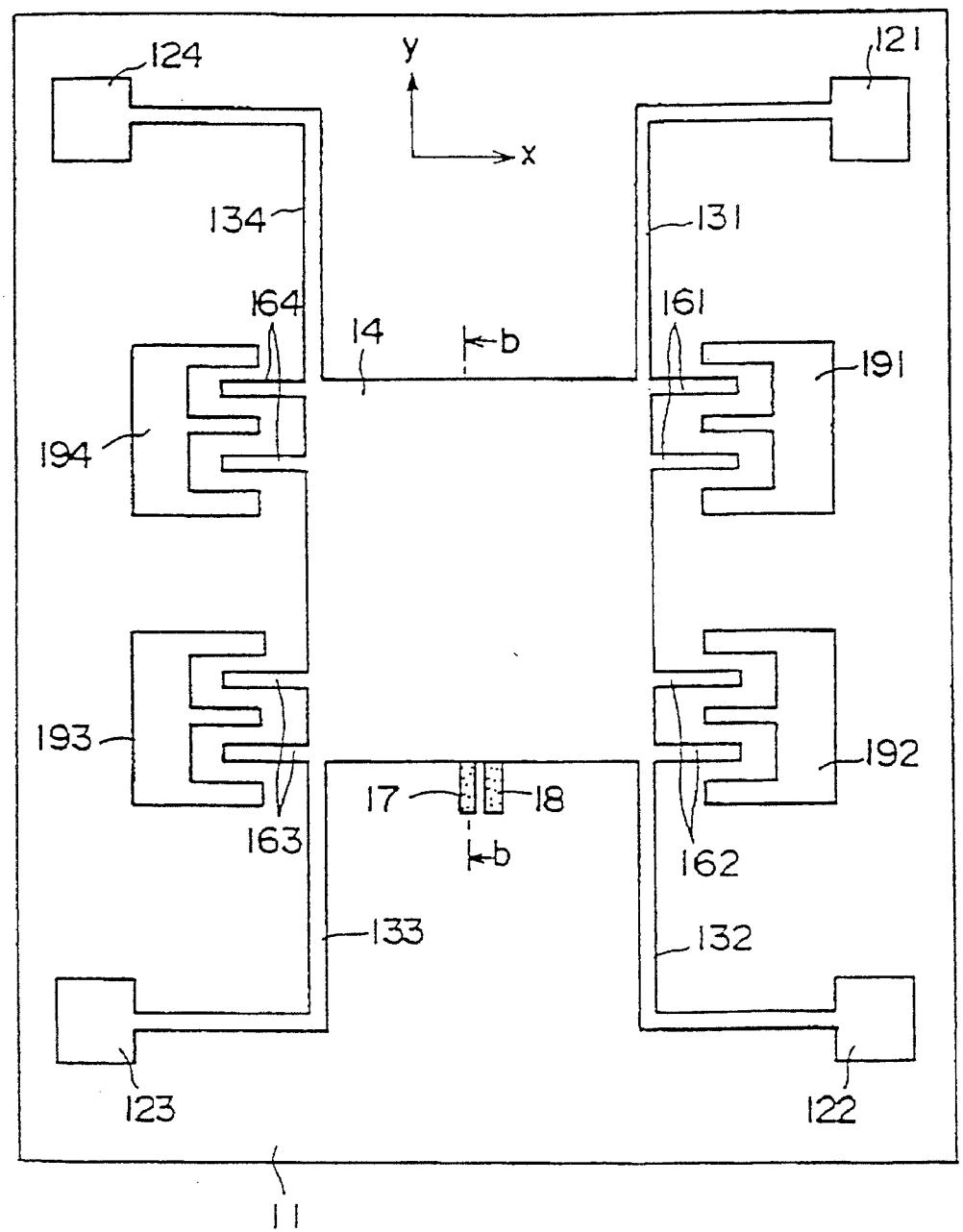
FIG. 4 is a planar structural diagram showing a second embodiment of this invention.

FIG. 4 indicates a planar structure of a second embodiment. According to the first embodiment indicated in FIG. 1, movable electrodes 151 and 152 detect a state of displacement perpendicular with respect to semiconductor substrate 11 by means of a Corioli's force produced by means of the yaw rate. In contrast to this, according to this embodiment, horizontal displacement of weight (mass) 14 of square planar configuration supported by respective beams 131 to 134 by means of anchors 121 to 124 is detected. That is to say, source electrode 17 and drain electrode 18 of a spline-shaped diffusion layer are formed in parallel on a main surface of semiconductor substrate 11 so that a respective portion of each overlaps with weight 14. Here, beams 131 to 134 supporting weight 14 are structured respectively by means of two sides in the x and y directions indicated in the drawing so as to be displaced in the x and y directions.

According to this embodiment, the amount of displacement due to yaw rate is detected by means of the change in gate width with respect to source electrode 17 and drain electrode 18. So that a minute change in gate width is detected, a small transistor of gate width is formed such that a rate of current change is not caused to be diminished.

When vibration in the x direction is imparted to weight 14 and yaw rate taking the perpendicular direction of substrate 11 as its axis is produced thereat, y-direction Corioli's force is produced at weight 14 and displacement occurs. Overlap of weight 14 which becomes the movable electrode at this time and source electrode 17 and drain electrode 18, i.e., gate width in transistor terms, changes and so a current change occurs, and yaw rate can be detected by means of this current change.

Figure 5A:
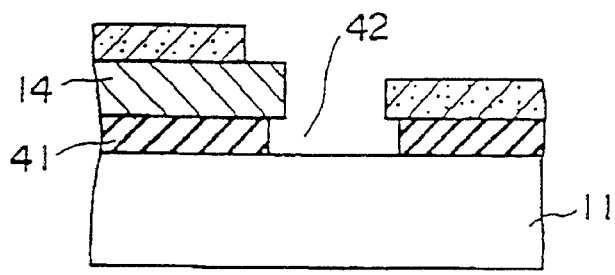
FIGS. 5A to 5D are sectional views sequentially describing methods of production of the second embodiment.

FIGS. 5A to 5D indicate in particular production steps of source electrode 17 forming the transistor portion according to this embodiment. Drain electrode 18 portion can be fabricated in a similar manner and so is omitted. As shown in FIG. 5A, first a sacrificial layer 41 and polycrystalline silicon layer are formed on semiconductor substrate 11, and this polycrystalline layer is machined to form weight 14 which is taken to be a movable electrode for gate use. Accordingly, opening 42 is formed in a portion taken to be the transistor source by means of a photolithographic step.

Figure 5B:
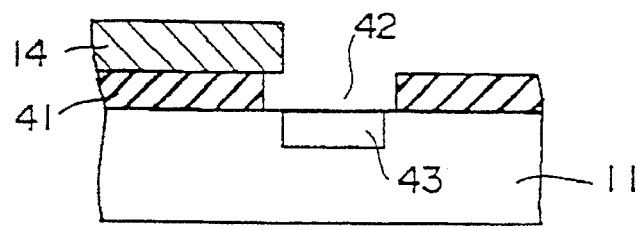

Next, as shown in FIG. 5B, by such means as ion implantation or the like, impurities are introduced on the main surface of semiconductor substrate 11 corresponding to opening 42, and diffusion layer 43 is formed. Diffusion layer 43 is taken to be a source electrode, and source electrode 17 is formed self-aligningly with respect to weight 14 taken to be a movable electrode for gate use. In such a state, weight 14 taken to be a movable electrode and diffusion layer 43 are not formed in opposition, and consequently the transistor gate width is at a state of "0."

Figure 5C:
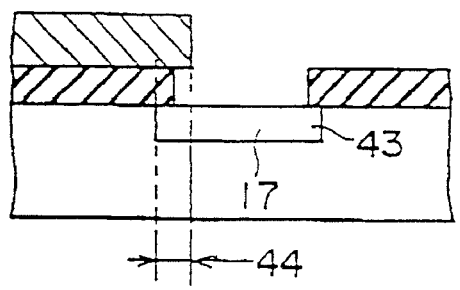
Figure 5D:
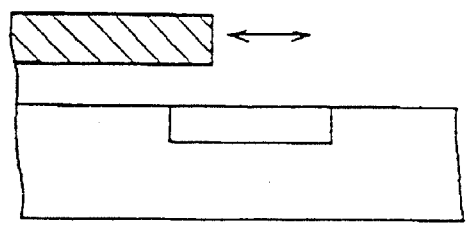

For this reason, as shown in FIG. 5C activation of impurities introduced by means of annealing is performed, and by means of the diffusion accompanying this activation overlap 44 equivalent to the gate width is formed at diffusion layer 43 and weight 14 taken to be a movable electrode, and a transistor construction which comes to function as the source electrode 17 is obtained. In such a state, as shown in FIG. 5D, when the sacrificial layer is removed by means of etching, weight 14 taken to be a movable electrode for gate use is caused to be displacable, and when weight 14 is displaced by means of a Corioli's force as shown by the arrow, the transistor gate width (overlap 44) changes and a current change corresponding to the amount of displacement of weight 14 is produced between the source and drain electrodes. That is to say, gate width comes to be established by means of the diffusion distance in diffusion layer 43, and consequently a transistor of minute gate width is accomplished easily with good reproducibility.

By means of current detection according to a change in gate width, a constantly linear current value corresponding to the magnitude of the yaw rate (Corioli's force) is detected. According to the first embodiment, yaw rate is detected by means of changes in distance between movable electrodes for gate use 151 and 152 and semiconductor substrate 11, and so when the ratio of change becomes large the magnitude of the yaw rate and the current change may deviate from a linear relationship. This is because the term for current is inversely proportional to the interval of air gap 24. However, according to this second embodiment, if the overlap of weight 14 taken to be a movable electrode on the one hand and source electrode 17 and drain electrode 18 on the other increase, current between the source and drain increases proportionately thereto, and conversely if the overlap diminishes, current between the source and drain decreases accordingly, and the magnitude of the yaw rate is accurately reflected in the current between the source and drain.

Additionally, impurities are introduced self-aligningly with respect to weight 14 that is a gate-use electrode, and by means of diffusing this source electrode 17 and drain electrode 18 are formed, and along with this a gate width is established corresponding to the overlap with weight 14 due to diffusion, and so transistor fabrication with no need for positioning in the manufacturing process and additionally having a minute gate width can be accomplished. For this reason, each fabricated sensor can reliably detect, with high accuracy, minute displacement of weight 14 which is a movable electrode, with no fluctuation in drain current.

Moreover, FIG. 4 indicates wherein only a set comprising source electrode 17 and drain electrode 18 are formed with respect to weight 14, but it is also acceptable for another source electrode and drain electrode to be formed corresponding for example to a side opposite weight 14. In this case, yaw rate can be detected by means of a differential in drain current at the two opposed transistors. In this case, acceleration perpendicular to the substrate which becomes the noise component can be eliminated.

According to this embodiment, in a case wherein acceleration in the perpendicular direction with respect to the plane of semiconductor substrate 11 is produced, the distance between semiconductor substrate 11 and weight 14 which is taken to be a movable electrode changes, the drain currents of the two sets of transistors established oppositely change in equal phase, and in a case wherein Corioli's force in the horizontal direction is produced, the drain currents of the two transistors change in reverse phase. For this reason, it can also become possible to detect and measure acceleration and yaw rate by means of one sensor mechanism. This is because the drain currents of the two transistors change in equal phase and in equal amounts with displacement of the gate electrode perpendicular to the substrate, and no differential appears. The fact that acceleration is in equal phase and yaw rate is in reverse phase is utilized.

Additionally, according to the embodiment one source electrode and drain electrode respectively are established in combination with respect to one transistor, but this can also be structured such that a plurality of source electrodes and drain electrodes respectively are established in parallel.

Figure 6:
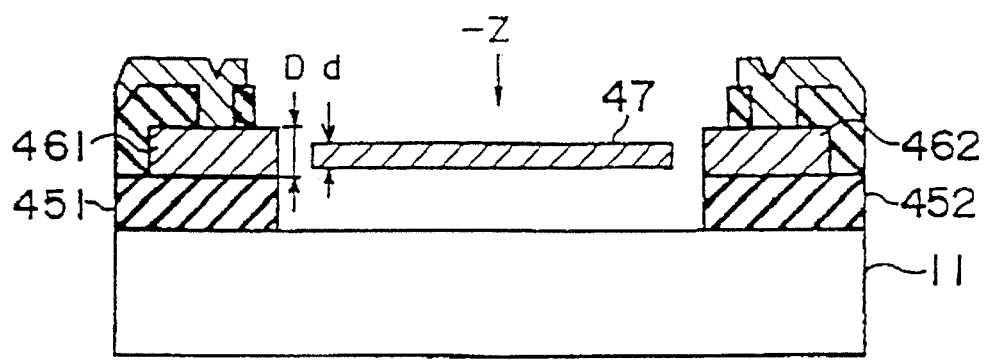
FIG. 6 is a sectional view of a movable electrode portion describing a third embodiment of this invention.

Next, a third embodiment will be described with a focus on points of difference from the first embodiment. FIG. 6 indicates the structure thereof. Insulation films 451 and 452 are formed at a specified interval on semiconductor substrate 11 composed of high-resistance silicon, and respective fixed electrodes for excitation use 461 and 462 are formed on these insulation films 451 and 452. Accordingly, movable electrode 47 composed of low-resistance silicon is disposed in the mutual interval between fixed electrodes for excitation use 461 and 462. Additionally, thickness D of fixed electrodes for excitation use 461 and 462 is thicker than thickness d of movable electrode 47, so that the movable electrode 47 may be easily displaced vertically by means of a Corioli's force. In this case, movable electrode 47 is fabricated to be substantially central in the direction of thickness of fixed electrodes 461 and 462.

According to a yaw rate sensor structured in this manner, voltage is applied to movable electrode 47, an inversion layer corresponding to layer 21 in FIG. 2A is caused to be formed, and current flows between the diffusion layers 172 and 182 (FIG. 1), which are taken to be the source electrode and drain electrode. Additionally, a voltage signal of specified frequency is applied to fixed electrodes for excitation use 461 and 462, and movable electrode 47 is caused to vibrate in a horizontal direction parallel to the plane of substrate 11 by means of electrostatic force.

When in this state movable electrode 47 receives a Corioli's force due to yaw rate and is shifted in the z direction perpendicular to the plane of substrate 11, current increases between diffusion layers 172 and 182 taken to be fixed electrodes. Consequently, a Corioli's force is detected by means of changes in the amount of current between diffusion layers 172 and 182, and yaw rate is determined.

Here, if movable electrode 47 and fixed electrodes for excitation use 461 and 462 are structured by means of equivalent film thickness, attraction force opposite to the z direction is exerted between movable electrode 47 and fixed electrodes 461 and 462 even if the movable electrode receives force in the z direction due to Corioli's force, and so braking force is exerted with respect to the displacement of movable electrode 47. For this reason, film thickness D of fixed electrodes 461 and 462 is structured to be larger than film thickness d of the movable electrode 47 so that attracting force is not exerted therebetween.

Figure 7A:
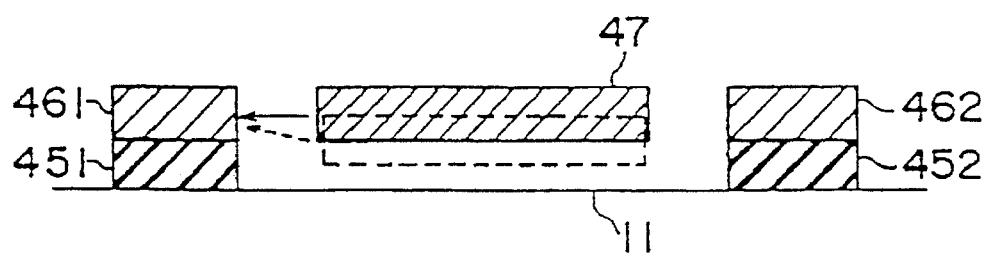
FIGS. 7A and 7B are drawings describing a mode of operation of the third embodiment.

This function will be explained in detail with reference to FIG. 7A, which indicates a case where the thicknesses of movable electrode 47 and fixed electrodes for excitation use 461 and 462 are identical. When in this state, movable electrode 47 is displaced toward the substrate, the inter-electrode capacitance of movable electrode 47 and fixed electrodes for excitation use 461 and 462 diminishes. Consequently, in a case wherein voltage has been applied between movable electrode 47 and fixed electrodes for excitation use 461 and 462, an upward force acts upon movable electrode 47 to draw it between fixed electrodes for excitation use 461 and 462.

Figure 7B:
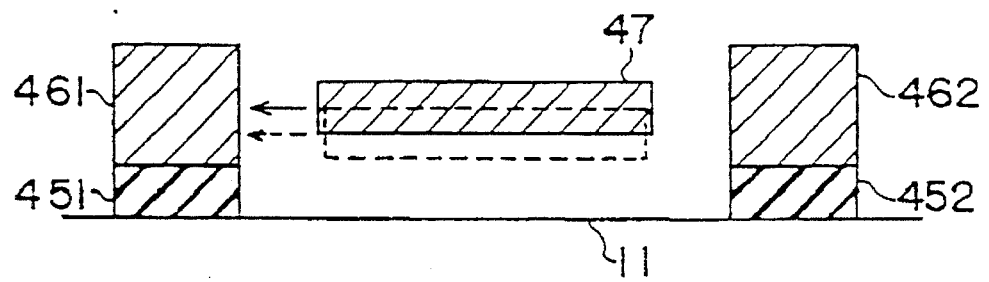

FIG. 7B indicates an example wherein the thickness of fixed electrodes for excitation use 461 and 462 has been made thicker than the thickness of movable electrode 47. When structured in this manner, the thickness of fixed electrodes for excitation use 461 and 462 is sufficiently thick with respect to movable electrode 47, and so when the opposing capacitance of fixed electrodes for excitation use 461 and 462 is considered, the inter-electrode capacitance therebetween does not change, even if movable electrode 47 is displaced. Consequently, movable electrode 47 is not drawn between fixed electrodes for excitation use 461 and 462. By means of varying the thickness of the movable electrode and of the fixed electrodes for excitation use in this manner, it can be accomplished such that movable electrode 47 is not drawn toward fixed electrodes for excitation use 461 and 462.

Figure 8:
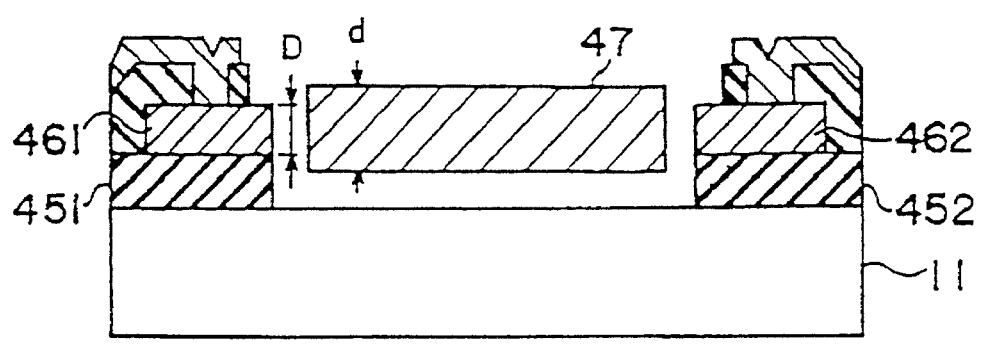
FIG. 8 is a drawing depicting a fourth embodiment of the invention.

FIG. 8 indicates a fourth embodiment, which will be described primarily in terms of differences with the foregoing third embodiment. Insulation films 451 and 452 are formed on semiconductor substrate 11 composed of high-resistance silicon, and respective fixed electrodes for excitation use 461 and 462 are formed on insulation films 451 and 452. Accordingly, movable electrode 47 composed of low-resistance silicon is disposed in the mutual interval between fixed electrodes for excitation use 461 and 462.

Herein, thickness D of the fixed electrodes for excitation use 461 and 462 is structured to be thinner than thickness d of movable electrode 47, so that movable electrode 47 may be easily displaced vertically by means of a Corioli's force. Moreover, movable electrode 47 is fabricated to be substantially central in the direction of thickness of fixed electrodes 461 and 462.

Figure 9:
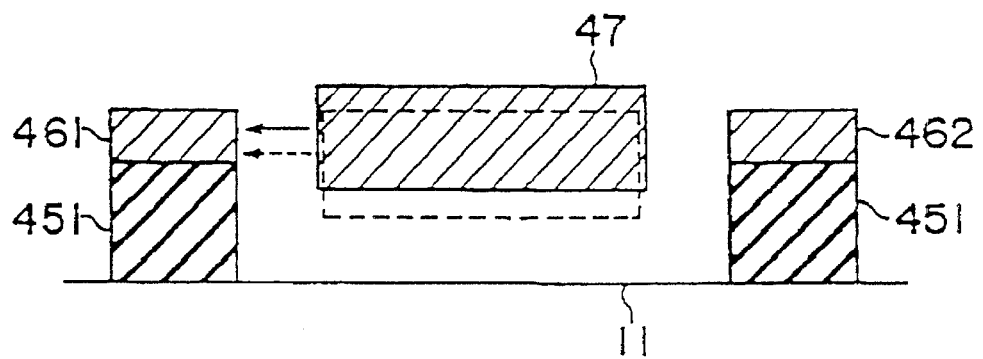
FIG. 9 is a drawing illustrating a state in a case of changed thicknesses of a movable electrode and fixed electrode for excitation use.

In FIG. 9, the film thickness of fixed electrodes for excitation use 461 and 462 is formed to be less than the film thickness of movable electrode 47. In a case wherein the film thickness of fixed electrodes for excitation use 461 and 462 is thinner than the film thickness of movable electrode 47 in this manner, when the opposing capacitance of fixed electrodes for excitation use 461 and 462 is considered, neither of these inter-electrode capacitances therebetween changes, even if movable electrode 47 is displaced. Consequently, movable electrode 47 is not drawn between fixed electrodes for excitation use 461 and 462, and by means of varying the thickness of the electrode portions in this manner, it can be accomplished such that movable electrode 47 is not drawn between fixed electrodes for excitation use 461 and 462.

Figure 10:
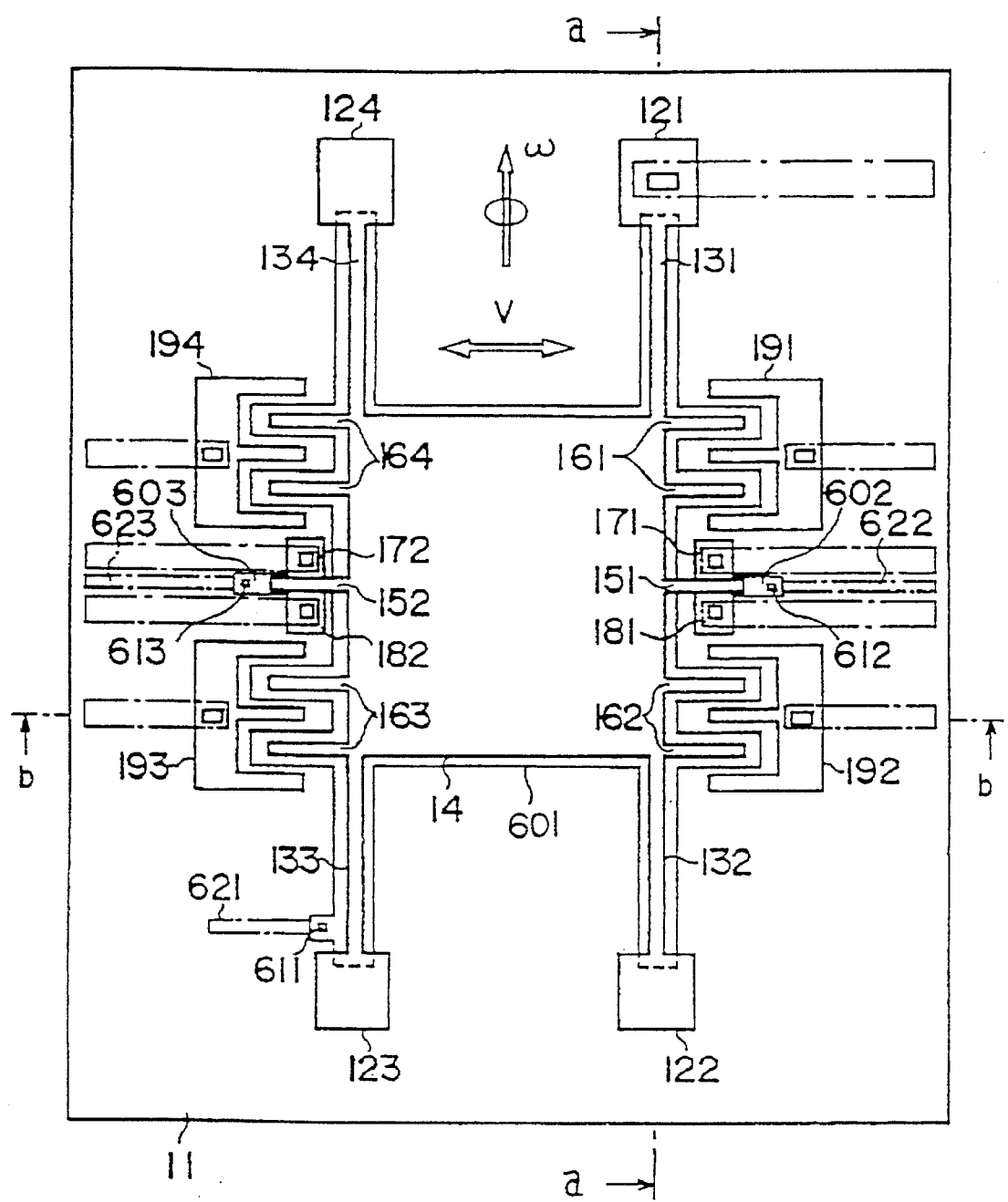
FIG. 10 is a planar structural diagram showing a fifth embodiment of the invention.
Figure 11A:
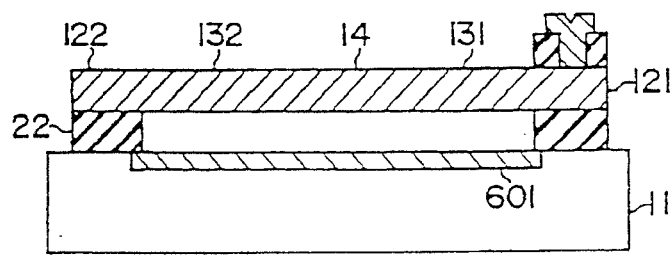
FIG. 11A is a sectional view of a portion corresponding to line a—a of FIG. 10.
Figure 11B:
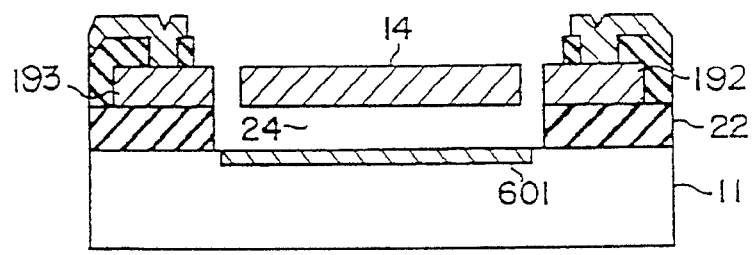
FIG. 11B is a sectional view of a portion corresponding similarly to line b—b.

FIG. 10 and FIGS. 11A and 11B indicate a fifth embodiment, which will be described primarily in terms of differences with the first embodiment. According to the first embodiment, because the movable electrodes, the weight, and moreover the beams are structured by means of conductive polycrystalline silicon, an inversion layer is formed between the source electrode and drain electrode, and when current is caused to flow therebetween, a potential difference is produced between the substrate and the weight and beams in addition to the movable electrodes, and electrostatic force is necessarily generated therebetween.

To estimate this electrostatic force, if for example the potential differential between the movable electrode and the substrate is taken to be 10 V and the gap is taken to be 0.5 μm, the electrostatic force become 1,771 N per square meter, and if the movable electrode is structured by means of polycrystalline silicon with a thickness of 1 μm, this is approximately 80,000 times the dead load.

Consequently, the movable electrode, weight (mass), and beams come to be drawn to the substrate by an extremely large force, and so that the movable electrodes are not touched with respect to the substrate it is necessary that the beams be rugged, i.e., that the spring constant of the beams be made large. However, this conversely makes the amount of displacement of the movable electrodes small in a case wherein a Corioli's force is received, and detection of the Corioli's force, i.e., detection of yaw rate, is made difficult. In order to reduce the influence of this electrostatic force, it is necessary to reduce the surface area wherein electrostatic force is generated.

This embodiment copes with this problem, and forms lower electrodes 601 to 603 on a surface of semiconductor substrate 11 so as to oppose to weight (mass) 14, beams 131 to 134, and the like, all of which do not function as a movable electrode (for gate use). Lower electrodes 601 to 603 are connected respectively via contact holes 611 to 613 to aluminum leads 621 to 623, and are applied a voltage equal to movable electrodes 151 and 152. By means of structuring lower electrodes 601 to 603 in this manner, the surface area generating electrostatic force is minimized, and contact with substrate 11 by movable electrodes 151 and 152 is prevented.

Figure 12:
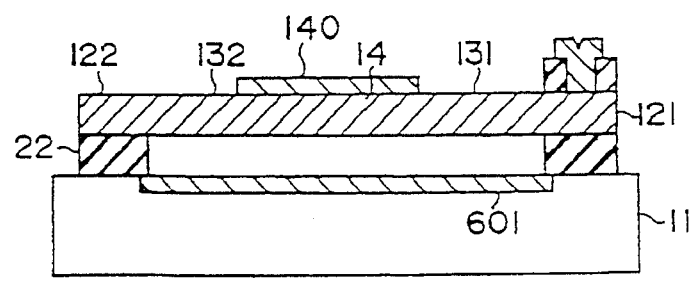
FIG. 12 is a drawing describing a means for imparting a Corioli's force.

Herein, the magnitude of Corioli's force is greatly influenced by the mass of the movable portion, and in order to obtain large force by means of Corioli's force and earn an amount of displacement, further weight (supplemental mass) 140 of metal having a large specific gravity such as for example gold, tungsten, or the like can be added on weight (mass) 14 as shown in FIG. 12.

Figure 13:
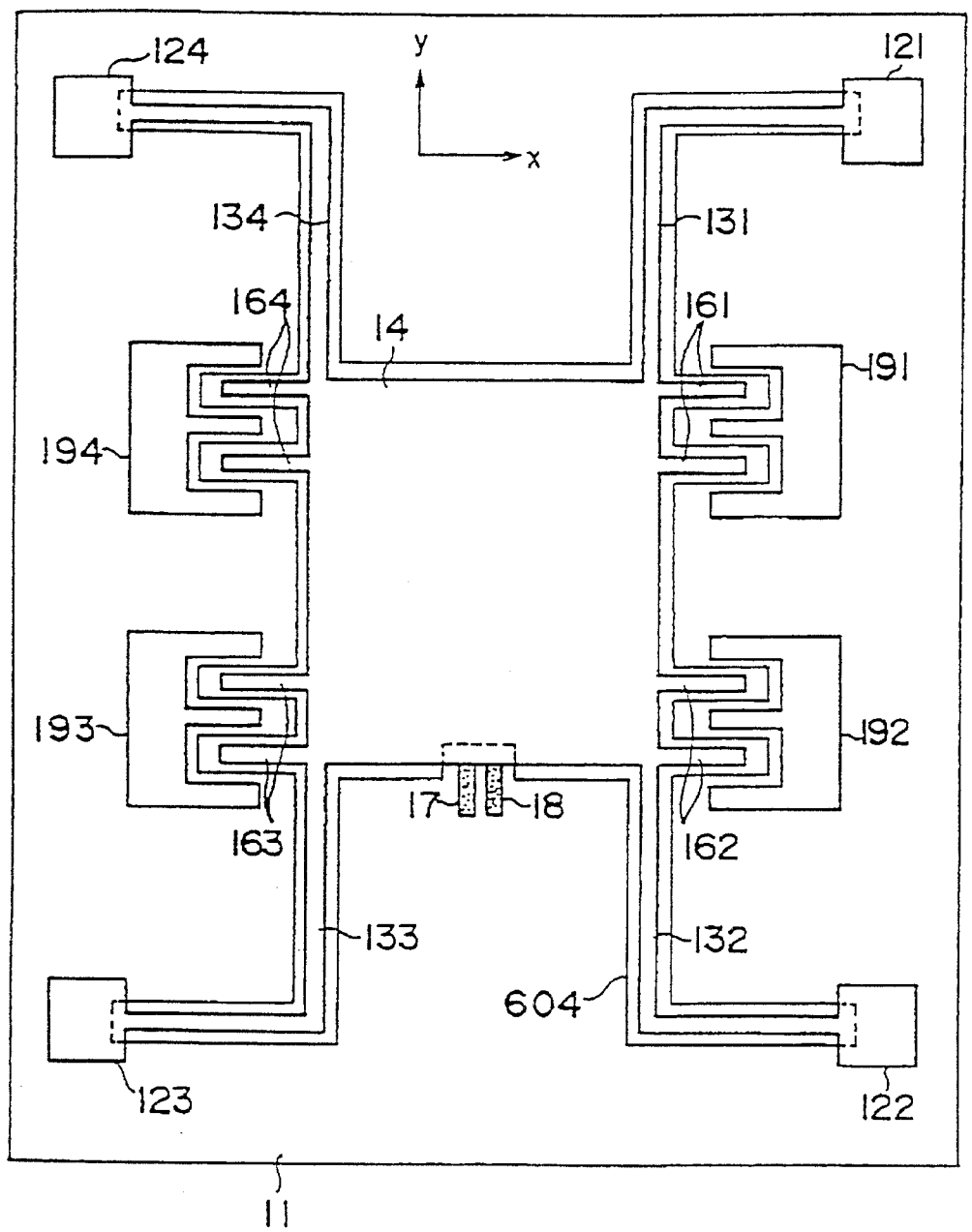
FIG. 13 is a planar structural diagram illustrating a sixth embodiment of the present invention.

FIG. 13 indicates a sixth embodiment, which will be described primarily in terms of differences with the second embodiment in particular. According to the second embodiment, indicated in FIG. 4, the movable electrodes, the weight, and beams are formed integrally by conductive polycrystalline silicon. For this reason, when an inversion layer is formed between the source electrode and drain electrode and current is caused to flow therebetween, a potential differential is also produced between the substrate and the weight and beams in addition to the movable electrodes, and electrostatic force is necessarily generated. Consequently, drawing toward the substrate by an extremely large force comes to occur, and in order that the movable electrodes do not touch the substrate it is necessary that the beams be made ruggedly so that the spring constant thereof is made large.

However, if the beams are structured so as to satisfy this condition, the amount of displacement of the movable electrodes becomes small in a case wherein conversely Corioli's force is received, and detection of the Corioli's force, i.e., the sensitivity of detection of yaw rate, is caused to be reduced. In order to reduce the influence of this electrostatic force, it is necessary to reduce the surface area which generates electrostatic force.

For this reason, in this embodiment, lower electrodes 604 is formed on the surface of semiconductor substrate 11 corresponding to a position of weight (mass) 14, beams 131 to 134, and the like, all of which form a movable member but do not function as a movable electrode. Lower electrode 604 is formed sufficiently larger than vibration so that it exists in the opposing portion even when the movable portion vibrates.

Lower electrode 604 is electrically isolated from source electrode 17 and drain electrode 18, and lower electrode 604 is connected to an aluminum lead portion via a contact hole (not illustrated).

In the above-described manner, a semiconductor yaw rate sensor according to this invention can be structured easily and at low cost, and can also detect exerted yaw rate with high accuracy, and can be mounted on for example an automobile or the like and utilized effectively in vehicle control and navigation or the like. Because in particular yaw rate can be detected with high accuracy by means of the transistor structure according to current values which change by means of yaw rate, it becomes possible to execute vehicle control or the like with high accuracy. Additionally, this semiconductor yaw rate sensor can be fabricated with simplicity by means of application of an ordinary IC fabrication process, and in particular the transistor structure which detects yaw rate can be fabricated with high precision with the relationship of members displaced by means of yaw rate action, and so a yaw rate sensor with high sensitivity and abundant reliability can easily be obtained.

Moreover, a yaw rate sensor according to the foregoing embodiments forms a characteristic layer on a substrate, forms movable electrodes and fixed electrodes, and forms sources and drains self-aligningly with respect to these movable electrodes, but this is not exclusive, and it is possible to previously form source and drain regions and subsequently form movable electrodes and fixed electrodes.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor yaw rate sensor comprising:

a semiconductor substrate;

a movable electrode having a beam structure disposed upon said semiconductor substrate at a specified interval therefrom;

a first fixed electrode for excitation use disposed via a specified gap with said movable electrode to cause vibration of said movable electrode at a specified cycle by means of electrostatic force; and a second fixed electrode for current detection use provided on said semiconductor substrate opposing said movable electrode;

wherein when yaw rate to be detected, which has as an axis a direction intersecting a direction of excitation of said movable electrode, acts upon said movable electrode, said yaw rate is detected based on a change in current produced at said second fixed electrode by means of a change in relative position of said movable electrode and said second fixed electrode.

2. A semiconductor yaw rate sensor according to claim 1, wherein said movable electrode disposed at said specified interval upon said semiconductor substrate includes at least one portion of a beam structure body having a weight, which said yaw rate to be detected acts upon and displaces, and a beam supporting said weight, and wherein said beam structure body includes a doubly supported structure formed of at least two said beams.

3. A semiconductor yaw rate sensor according to claim 1, wherein a vibration range of said movable electrode is a range wherein opposing surface areas of said movable electrode and said second fixed electrode remain uniform.

4. A semiconductor yaw rate sensor according to claim 1, wherein said movable electrode is formed of a spindle configuration, and a lengthwise width of said movable electrode is longer than a width of said second fixed electrode.

5. A semiconductor yaw rate sensor according to claim 1, wherein said first fixed electrode is an electrode of the same height as said movable electrode and is disposed via said specified gap from said movable electrode.

6. A semiconductor yaw rate sensor according to claim 1, wherein said second fixed electrode includes a plurality of electrodes including an impurity diffusion layer formed on a surface portion of said semiconductor substrate opposing said movable electrode.

7. A semiconductor yaw rate sensor according to claim 1, wherein:

said movable electrode is an electrode of spindle configuration supported by a beam structure body;

said second fixed electrode for current detection use is an electrode including an impurity diffusion layer formed on a surface portion of said semiconductor substrate opposing said movable electrode at two sides of said movable electrode; and a transistor composed of said movable electrode and said second fixed electrode, with both said movable electrode and said second fixed electrode being disposed such that a gate width of said transistor does not change even by means of vibration of said movable electrode insofar as said yaw rate to be detected is not produced.

8. A semiconductor yaw rate sensor according to claim 1, further comprising a transistor formed with said movable electrode, said semiconductor substrate and said second fixed electrode; and wherein an amount of displacement produced at said movable electrode in a case wherein said yaw rate to be detected is produced on an axis parallel to a plane of said semiconductor substrate in a direction intersecting a direction of vibration of said movable electrode is detected by a current change of said second fixed electrode.

9. A semiconductor yaw rate sensor according to claim 8, wherein said second fixed electrode includes at least two electrodes, and said yaw rate to be detected is detected by means of a change in current flowing mutually between said at least two electrodes.

10. A semiconductor yaw rate sensor according to claim 1, further comprising a transistor formed with said movable electrode, said semiconductor substrate and said second fixed electrode; and wherein an amount of displacement produced at said movable electrode in a case wherein said yaw rate to be detected is produced on an axis perpendicular to a plane of said semiconductor substrate in a direction intersecting a direction of vibration of said movable electrode is detected by a current change of said second fixed electrode.

11. A semiconductor yaw rate sensor according to claim 10, wherein said second fixed electrode includes at least two electrodes, and said yaw rate to be detected is detected by means of current change accompanying a change of an inversion region mutually between said at least two electrodes.

12. A semiconductor yaw rate sensor according to claim 1, wherein a main body portion of said movable electrode is formed so as to have at least one edge of linear configuration, said fixed electrode for current detection use includes at least two electrodes, and is formed so that one end of each of said at least two electrodes is disposed in a spindle configuration so as to engage said edge portion of said movable electrode.

13. A semiconductor yaw rate sensor according to claim 1, wherein said movable electrode is formed so as to have a pair of edges at opposing positions, and said second fixed electrode is suitably formed in correspondence with these respective end portions so as to respectively engage this pair of end portions.

14. A semiconductor yaw rate sensor according to claim 1, wherein:

said movable electrode is formed of a main body portion supported so as to freely vibrate by means of a plurality of beams, and a spindle-shaped member protruding into an outer periphery of said main body portion;

an excitation electrode is formed of said spindle-shaped member protruding from said main body portion, and said excitation electrode is disposed via a gap on said first fixed electrode established fixedly on said semiconductor substrate; and said first fixed electrode includes a plurality of spindle-shaped members disposed in a comb-tooth configuration to sandwich said excitation electrode.

15. A semiconductor yaw rate sensor according to claim 1, wherein said semiconductor substrate includes a lower electrode in a region opposing said movable electrode and in a region wherein at least said second fixed electrode does not exist, and said movable electrode and said lower electrode are provided with equal potential such that electrostatic attraction force is not exerted between said movable electrode and said lower electrode.

16. A semiconductor yaw rate sensor according to claim 1, wherein:

said movable electrode includes a main body portion and a spindle-shaped member protruding to one side of said main body portion;

said first fixed electrode includes a fixed electrode member disposed in a position on both sides of said spindle-shaped member forming said movable electrode;

a thickness of said fixed electrode member differs from a thickness of said movable electrode spindle-shaped member; and opposing surface area of said movable electrode and said fixed electrode member does not change even if said movable member is displaced.

17. A semiconductor yaw rate sensor comprising:

a semiconductor substrate;

a movable electrode disposed at a first interval above a surface of said semiconductor substrate, and supported so as to be freely displacable via a beam structure body;

a fixed electrode for excitation use disposed at a second interval above said semiconductor substrate surface, and disposed via a specified gap with said movable electrode to utilize static electricity to cause vibration of said movable electrode; and source and drain electrodes formed by means of an impurity diffusion layer on a surface portion of said semiconductor substrate at positions opposing said movable electrode;

wherein a transistor is formed by said movable electrode, said semiconductor substrate and said source and drain electrodes, a current change is produced between said source and drain electrodes by means of displacement of said movable electrode produced when said fixed electrode vibrates said movable electrode at a specified cycle, and yaw rate is detected by means of said current change.

18. A semiconductor yaw rate sensor according to claim 17, wherein said movable electrode disposed at said first interval above said semiconductor substrate includes at least one portion of a beam structure body having a weight which said yaw rate to be detected acts upon and displaces and a beam supporting said weight, and said beam structure body includes a doubly supported structure by means of at least two of said beams.

19. A semiconductor yaw rate sensor according to claim 17, wherein said movable electrode is formed in a spindle configuration, and a lengthwise width of said movable electrode of spindle configuration is disposed in a state to be longer than a width of said source and drain electrodes.

20. A semiconductor yaw rate sensor according to claim 17, wherein said fixed electrode is an electrode positioned above said semiconductor substrate, disposed at said second interval from said semiconductor substrate surface, and also at an equal height as said movable electrode, and is disposed via said specified gap with said movable electrode.

21. A semiconductor yaw rate sensor according to claim 17, wherein said movable electrode is formed in a spindle configuration, and said source and drain electrodes are disposed such that a gate width of said transistor does not change even by means of vibration of said movable electrode insofar as said yaw rate to be detected is not produced.

22. A semiconductor yaw rate sensor according to claim 17, wherein an amount of displacement produced at said movable electrode in a state wherein said yaw rate to be detected is produced on an axis perpendicular to a plane of said semiconductor substrate is detected by a current change accompanying a change of an inversion area mutually between said movable electrode and said source and drain electrodes.

23. A semiconductor yaw rate sensor according to claim 17, wherein a main body portion of said movable electrode is structured so as to have at least one edge of linear configuration, and said source and drain electrodes are formed so that one end of each is arranged in a spindle configuration so as to engage said edge portion of said movable electrode.

24. A semiconductor yaw rate sensor according to claim 17, wherein said movable electrode is formed so as to have a pair of edges at opposing positions, and said source and drain electrodes are formed in correspondence with said edges so as to respectively engage this pair of edges, said yaw rate is detected by means of differential in drain currents.

25. A semiconductor yaw rate sensor according to claim 17, wherein:

said movable electrode includes a main body portion supported so as to be freely vibrated by means of a plurality of beams, and a spindle-shaped member protruding into the outer periphery of said main body portion, an excitation electrode is formed by means of said spindle-shaped member protruding from said main body portion, and said excitation electrode is disposed via a gap on said fixed electrode established fixedly on said semiconductor substrate; and said fixed electrode includes a plurality of spindle-shaped members disposed in a comb-tooth configuration to sandwich said excitation electrode.

26. A semiconductor yaw rate sensor according to claim 17, wherein said semiconductor substrate includes a lower electrode disposed in a region opposing said movable electrode and in a region wherein at least said source and drain electrodes do not exist, and said movable electrode and said lower electrode are provided with equal potentials such that electrostatic attraction force is not exerted therebetween.

27. A semiconductor yaw rate sensor according to claim 17, wherein said movable electrode includes a main body portion and a spindle-shaped member protruding to one side of said main body portion, said fixed electrode includes a fixed electrode member disposed in a position on both sides of said spindle-shaped member forming said movable electrode, a thickness of said fixed electrode member differs from a thickness of said movable electrode spindle-shaped member, and opposing surface areas of said movable electrode and said fixed electrode member do not change even if said movable member is displaced.

* * * * *